Figure 1:
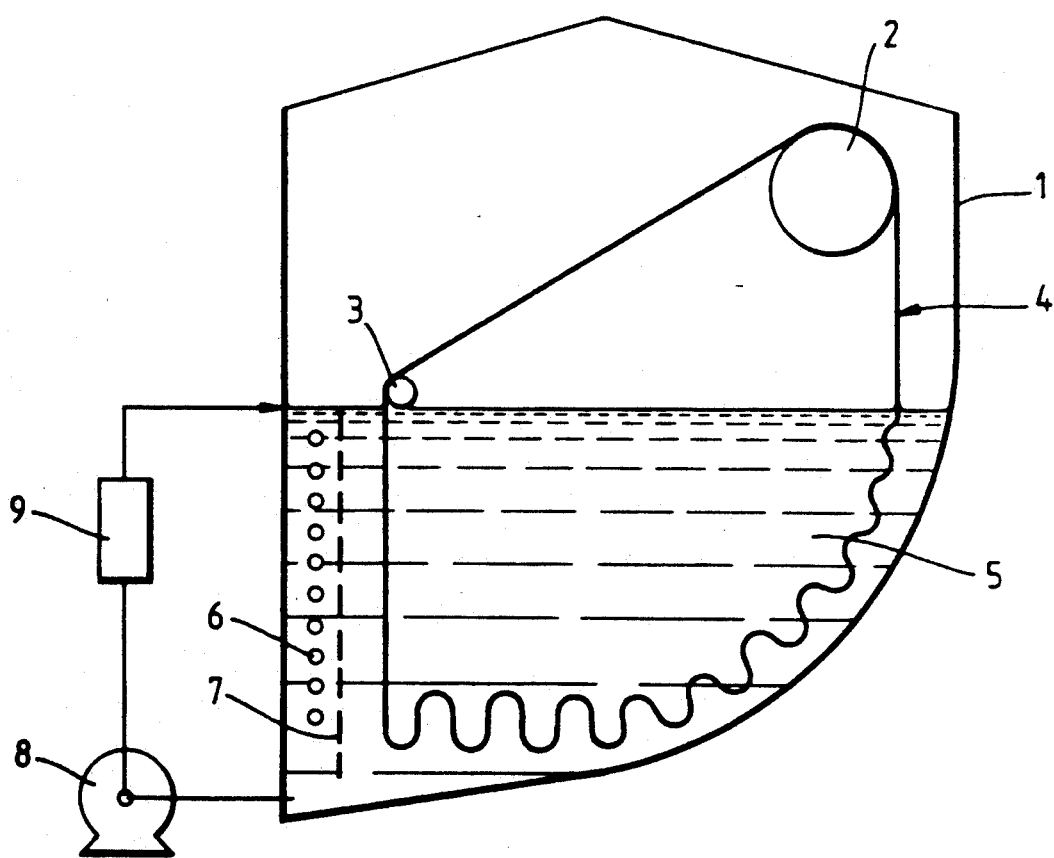

United States Patent [19]
Cockett et al.

[11] Patent Number: 5,246,467
[45] Date of Patent: Sep. 21, 1993

[54] REMOVING UNREACTED DYE FROM FABRIC: BATH LIQUORS TREATED WITH ABSORBENT HYDROTALCITE

[75] Inventors: Keith R. F. Cockett, West Lancashire; Martin Concannon, Merseyside; Maurice Webb, Chester, all of United Kingdom

[73] Assignee: Unilever Patent Holdings B.V., Rotterdam, Netherlands

[21] Appl. No.: 834,315
[22] PCT Filed: Jun. 13, 1991
[86] PCT No.: PCT/GB91/00947
§ 371 Date: Mar. 18, 1992
§ 102(e) Date: Mar. 18, 1992
[87] PCT Pub. No.: WO91/19850
PCT Pub. Date: Dec. 26, 1991

[30] Foreign Application Priority Data
Jun. 15, 1990 [EP] European Pat. Off. ............ 90306567
Mar. 28, 1991 [GB] United Kingdom ................ 9106662

[51] Int. Cl.⁵ .................. B01D 15/00; C02F 1/28; D06P 1/38; D06P 5/02
[52] U.S. Cl. .................................. 8/543; 8/549; 8/618; 8/918; 8/917
[58] Field of Search ..................... 8/543, 618

[56] References Cited
U.S. PATENT DOCUMENTS
4,458,030  7/1984  Manabe et al. ............... 502/183

FOREIGN PATENT DOCUMENTS
56-098265  8/1981  Japan .

OTHER PUBLICATIONS
H. Zollinger, "Color Chemistry", (VCH), 1987, p. 136.
E. R. Trotman, "Dyeing and Chemical Technology of Textile Fibres," Sixth Edition, (Wiley-Interscience) 1984, pp. 447-450 and 456.

Primary Examiner—A. Lionel Clingman
Attorney, Agent, or Firm—Cushman, Darby & Cushman

[57] ABSTRACT

It is necessary to remove unbound reactive dyes from the surfaces of textile substrates treated with dyes of this class; this is to ensure the dyed substrate is fast. In the invention dye is removed from a wash medium by contracting the medium with an absorbent, preferably a hydrotalcite-like material, which removes suspended dye. This removal allows re-use of the wash medium or its disposal.

5 Claims, 1 Drawing Sheet

REMOVING UNREACTED DYE FROM FABRIC: BATH LIQUORS TREATED WITH ABSORBENT HYDROTALCITE

FIELD OF THE INVENTION

This invention relates to the post washing of dyed textiles. Textile surfaces are treated with reactive dyes, these contain a chromophore and a reactive site, but a proportion of the dye remains loosely bound to the textile surface and has to be removed by washing.

BACKGROUND TO THE INVENTION

Reactive dyes are widely used in the treatment of cotton, wool and regenerated cellulose because good fastness is achieved with a wide range of shades. After the dyeing stage it is necessary to remove the unreacted dye from the textile to ensure all the dye remaining on the textile surface is fast.

This washing stage is a lengthy process because a number of separate washing baths have to be used in sequence to ensure the final stage removes the remnants of dye only loosely bound to the surface. Thus the washing procedure uses a considerable amount of water and chemicals added to the washing baths to assist dye removal. The baths are usually operated at a temperature in the range 60° C. to 100° C. and therefore considerable heat energy is required. An additional consideration is the large quantity of water which contains washed off dye and which has to be disposed of via an effluent system. Environmental requirements are becoming more restrictive on the discharge of water containing coloured material and there is, in any case, a poor visual impact on water courses by such discharge. The process of reactive dyeing and washing is described in "The Dyeing of Cellulosic Fibres" published Dyers Company Trust 1986.

GENERAL DESCRIPTION OF THE INVENTION

The invention provides a method of removing loosely bound reactive dye on a textile surface wherein the textile surface is immersed in an aqueous bath characterised by contacting the bath medium with a material capable of absorbing the dye suspended or dissolved in the medium.

A preferred absorbing material is a hydrotalcite-like material, such term includes the calcined material. Other examples of absorbent material will have surface absorption sites for anions.

Thus, the present invention utilises anion exchange materials related to a compound of the formula $Mg_6Al_2(OH)_{16}CO_3 \cdot 4H_2O$ known as hydrotalcite, and for convenience referred to hereinafter as hydrotalcite-like materials.

The hydrotalcite-like materials useful in this method of removing non bound dyes according to the present invention can be described by formula I below:

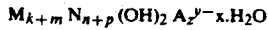

where:
M is any 1+ or 2+ cation or combination thereof
N is any 3+ or 4+ cation or combination thereof
k is the sum of the individual mole fractions of the 1+ cations
m is the sum of the individual mole fractions of the 2+ cations
n is the sum of the individual mole fractions of the 3+ cations
p is the sum of the individual mole fractions of the 4+ cations where either but not both of k and m or n and p can be zero and $k+m+n+p=1$.
$A_z^{y-}$ is any anion of charge $y-$ and mole fraction z, or combination of anions of similar or differing $y-$ and $k+2m+3n+4p-2-zy=0$ and x can range from 1 to 100.

Examples of the cations M in the above formula are $Li^+$, $Mg^{2+}$, $Zn^{2+}$, $Fe^{2+}$, $Cu^{2+}$, $Sn^{2+}$, $Ca^{2+}$ and $Sr^{2+}$. Suitable N cations include $Al^{3+}$, $Fe^{3+}$, $Ti^{4+}$ and $Sn^{4+}$.

Preferred divalent cations are $Zn^{2+}$, $Cu^{2+}$ or $Mg^{2+}$ or a combination of these ions, or a combination with other divalent cations.

The anion A may be an inorganic or organic anion. Preferred inorganic anions A are $Cl^-$, $NO_3^-$, $SO_4^{2-}$, $CO_3^{2-}$ and $OH^-$. Examples of organic anions are carboxylate ions such as citrate and stearate.

Examples of hydrotalcite-like materials of this invention are:

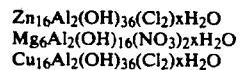

Preparation of hydrotalcite-like compounds is known and has been described in a number of publications including Solid State Ionics 22 (1986) pages 135–141 where there is published a paper by Walter T Reichle entitled "Synthesis of Anionic Clay Minerals (Mixed Metal Hydroxides, Hydrotalcite)" and Chemtech (January 1986) pages 58–63 where there is published a paper by Walter T Reichle entitled "Anionic Clay Minerals".

The applicants have found hydrotalcite-like materials of grain size less than 110 Angstrom can absorb colorants at a faster rate than materials with a grain size greater than 110 Angstroms. These finer grain size materials also have a grater absorbant capacity. Preferably the grain size is less than 100 Angstrom, more preferably between 40 and 100 Angstrom. These grain sizes are measured in the <001> direction by X-ray diffraction.

The method is applicable to all batch, ie discontinuous, washing systems, for example winches, jet, beams, package, stock, garment and hank. It is also applicable to several washing stages used in sequence to give a continuous process.

A. Zinc/aluminium hydrotalcite-like material

A zinc/aluminium hydrotalcite-like material useful in the present invention may be prepared in one of the following ways or in other ways known in the art:

1. A 1 mol $dm^{-3}$ solution of an 8:1 molar ratio of zinc chloride and aluminium chloride was prepared. To this a 2 mol $dm^{-3}$ solution of sodium hydroxide was added until the original pH of the chloride solution had been increased from around 3 to pH 6.75. This resulted in the formation of a white gel-like precipitate which was separated by centrifuging. The precipitate was then washed by suspension in demineralised water followed by centrifuging. This washing process was repeated several times. The gel was then dried at 80° C. to 100° C. and ground to a fine powder.

2. A 1 mol $dm^{-3}$ solution of an 8:1 molar ratio of zinc chloride and aluminium chloride was prepared and simultaneously pumped into a 5 liter beaker, fitted with a stirrer, along with a 5 mol $dm^{-3}$ solution of sodium hydroxide. The rate of addition of sodium hydroxide was varied to maintain a pH of 6.5 in the reaction mixture. The resulting gel was separated and washed as described above. Particles of the washed precipitate were then dried in different ways:
a) spray dried;
b) slurried in alcohol, filtered and oven dried at 50° C. The resulting precipitate was then hammer milled to form a fine powder;
c) slurried in nonionic surfactant (Synperonic A7 ex ICI) filtered and oven dried at 50° C. The resulting precipitate was then hammer milled to form a fine powder.

B. Magnesium/aluminium hydrotalcite-like materials

A magnesium/aluminium hydrotalcite-like material useful in the present invention may be prepared in the following way or in other ways known in the art.

To 98 liters of water 19.5 kg of sodium hydroxide was added followed by 25 kg of magnesium nitrate and 18.3 kg of aluminium nitrate dissolved in 73 liters of water to give a Mg:Al ratio of 3:1. The nitrate solution was added over a period of 30 minutes with stirring. The solution was heated at 90° C. to 100° C. for 2 hours. The resulting precipitate was filtered and washed. The precipitate was treated as follows:
(i) a sample was resuspended in water to give a 10% solids slurry;
(ii) a sample was spray dried; and
(iii) a sample was oven dried at approximately 120° C. and micronised using a fluid energy mill.

C. Mg/Al hydrotalcite-like material of small grain size

A magnesium/aluminium hydrotalcite-like material of finer grain size useful in the present invention is prepared as follows:

An alkali solution comprising 150 liters of a mixed sodium hydroxide/sodium carbonate alkali solution and having a total anion concentration of 5M and a hydroxide to carbonate molar ratio of 3:1, was added to a vessel containing around 66 liters of demineralised water to raise the pH from neutral to around pH 10.

A solution of aluminium sulphate and magnesium sulphate having a total metal ion concentration of 2M and a magnesium to aluminium molar ratio of 3:1, was added to the vessel and the vessel contents were agitated. The rate of addition of the sulphate solution was adjusted to maintain a pH in the solution of 10 to 10.5. Immediate precipitation occurred on addition of the sulphate solution however the resulting slurry was cooled to maintain a temperature of 25° C. The reaction time was approximated 50 minutes, plus 10 minutes agitation once addition of the solutions was complete. The slurry was then pressed to form a filter cake and the cake was washed with demineralised water. The wash filtrate was tested for the presence of sulphate anion using barium chloride solution, which indicated that most of the sulphate had been removed from the cake. The cake was then reslurried in water and spray dried to give granules with average particle size of about 30 μm.

The grain size of this material was measured by X-ray powder diffraction using a Philips series 17 diffractometer and Cuk—radiation. The (001) reflection peak was converted into full-width-at-half-maximum values using either $$FWHM_L = \frac{2.00}{B} \quad \text{or} \quad FWHM_{SQL} = \frac{1.29}{B}$$

by measuring the breadth (B) and fitting these to either lorentzian or squared-lorentzian profiles. The peak position and FWHM values are inserted into the Scherrer equation described in EF Kaelbu, Handbook of X-rays, McGraw-Hill, (1967) from which the grain size can be calculated. The grain size was found to be 53 Å.

It has been found that the morphology of hydrotalcite-like materials is dependent on their method of preparation. Especially preferred are methods of preparation which give rise to porous materials such as spray drying.

The method will be described with reference to a winch bath. A preferred method has the wash medium circulated from the wash bath and contacted with the absorbent material external to the bath. The absorbent material is preferably held in a cartridge which allows renewal of the absorbent material with only a short break in processing. Absorbents other than hydrotalcite like materials which are usable in the method are modified cellulose, for example epichlorhydrin tri-ethanolamine cellulose obtainable from Sigma Chemicals of St Louis U.S.A.

SPECIFIC DESCRIPTION OF THE INVENTION

Examples of the method will now be described to illustrate but not limit the invention, with reference to the accompanying figure which shows a vertical section through a winch washing bath.

EXAMPLE I

A bath casing 1 contains a horizontal driven paddle roller 2 and horizontal idle roller 3. A length of textile 4 extends round the rollers and is suspended in a wash bath medium 5 which is continuously agitated by means not shown. The bath is maintained at a temperature of about 95° C. to 100° C. by means of heating-coil 6 separated from the fabric path by perforated plate 7. A pump 8 draws wash water containing suspended dye from the base of the casing and returns it via filter 9. The filter contains an active absorbent material (spray dried $Mg_6Al_2(OH)_{16}(NO_3)_2xH_2O$) capable of absorbing suspended reactive dye. Conveniently the absorbent is contained in a filter bag which is removable from the body of the filter.

A sample of cotton fabric was loaded and water added to give a 14:1 water:fabric ratio. A reactive dye, eg Procion Red HE or Procion Turquoise HA, was added at a level of 3% w/w on the cotton fabric. The fabric was circulated in the dye liquor for 30 minutes while the temperature was raised to 85° C. Then sodium chloride (80 g/l) was added in three stages and the fabric circulated for 10 minutes. After this dyeing step soda ash (20 g/l) was added and the fabric circulated for 40 minutes with the dye bath at 90° C.

The HT filter material was then prepared in the filter (5% on weight of cotton) and the dye bath medium circulated through the filter 9 by means of pump 8.

The pump provided a complete bath circulation of 3 times per minute. After 10 minutes the pump was stopped and the dye liquor drained. The winch casing 1 was then filled with cold water and the fabric circulated for 10 minutes. The pump was operated during this time. After this washing step, which rinsed the casing 1, the casing was again filled with water and the temperature raised to 95° C. with the fabric being rotated. The filter 9 was given a fresh charge of HT for this final washing stage which continued for 30 minutes to ensure all the loosely bound dye had been removed from the fabric and absorbed in the filter. The resultant wash medium could be discharged to effluent, being substantially decolourised.

Alternatively the absorbent material could be added to the wash medium in a sachet or like dosing article.

The benefits in using the method of the invention can be appreciated from table I which quotes the characteristics of the method described previously and conventional washing procedure. These results are based on the treatment of 250 Kg cotton in 3500 l baths.

In a conventional washing procedure the dyeing process was taken to the addition of soda ash and circulation of the fabric for 40 minutes at 90° C. The bath was then emptied and refilled and the fabric cold rinsed for 15 minutes while being circulated. The bath was emptied and refilled and raised to 95° C., the fabric was circulated for 30 mins. The following wash steps were then applied.

i) bath emptied, refilled and fabric circulated for 15 minutes at 60° C. (3 times)
ii) bath charged with fresh water twice for 15 minutes washing at room temperature.

TABLE I

|  | Method of invention | Conventional |
|---|---|---|
| Time taken | 4½ hrs | 8 hrs |
| Water used | 10,500 l | 28,000-l |
| Comparative energy used | 58 | 100 |
| Effluent colour | virtually clear | deeply coloured |

EXAMPLE II

A sample (1) of magnesium/aluminium hydrotalcite-like materials was prepared as described previously (method B) and spray dried.

A sample (2) of small grain size material was prepared by method C.

200 g samples of knitted unmercerised cotton fabric were dyed as described in Example I. Separate dyeings were carried out for two different reactive dyes, Remazol Red RB (ex Hoechst) and Procion Turquoise HA (ex ICI).

In all cases, Hydrotalcite was charged into the filter bag at 25 g. As described in Example I, the dyebath medium was pumped through the hydrotalcite at the end of the dyeing cycle to remove excess dyestuff from the water, prior to discharge of the liquor to drain. Samples were taken from the main body of the liquor in the winch—to monitor the rate of decrease of dyestuff in solution, and from the return line from the filter to the winch - this monitors the efficiency of the Hydrotalcite absorbant.

The absorbence of each sample was measured on a uv/vis spectrometer at the wavelength of maximum absorption of the dyestuffs, 520 nm for Remazol Red RB and 670 nm for Procion Turquoise HA. Therefore the lower the absorbence of a particular sample, the lower the dyestuff concentration in that particular sample.

As described in Example I, after the dyebath medium was discharged to drain, the winch was filled with cold water and the fabric circulated for 10 minutes before this was discharged to drain.

The winch was then refilled, the filter charged with a fresh 25 g sample of Hydrotalcite. The temperature was raised to 95° C. and the liquor circulated through the filter for 60 minutes. Liquor samples were gain collected from the main liquor body in the winch and from the return line from the filter to the winch.

The results obtained are given in Tables I and II.

TABLE I

Treatment of the Exhausted Dyebath Liquor

|  | Sample 1 | | Sample 2 | |
|---|---|---|---|---|
| Time/Mins | Inside Winch | At Filter Outlet | Inside Winch | At Filter Outlet |
| i) Remazol Red RB | | | | |
| Absorbence at 520 nm | | | | |
| 0 | 2.080 | 1.382 | 2.069 | 1.004 |
| 2 | 1.543 | 1.531 | — | — |
| 3 | — | — | 1.049 | 0.747 |
| 5 | 1.590 | 1.593 | 0.887 | 0.719 |
| 10 | 1.682 | 1.695 | 0.736 | 0.744 |
| 15 | 1.683 | 1.698 | 0.733 | 0.757 |
| i) Procion Turquoise HA | | | | |
| Absorbence at 670 nm | | | | |
| 0 | 3.678 | 2.168 | 3.368 | 0.551 |
| 2 | — | — | 0.709 | 0.659 |
| 3 | 1.842 | 1.720 | — | — |
| 5 | 2.040 | 1.976 | 0.761 | 0.718 |
| 10 | 2.240 | 2.186 | 0.834 | 0.825 |
| 15 | 2.260 | 2.208 | 0.928 | 0.875 |

Results clearly show that both samples of hydrotalcite significantly reduce the level of dyestuff in the exhausted dyebath liquor and that Sample 2 achieves this reduction more rapidly than Sample 1 and removes, in total, some approx. 60% more dyestuff than Sample 1.

TABLE II

Treatment of the Hot Wash-off Liquor

|  | Sample 1 | | Sample 2 | |
|---|---|---|---|---|
| Time/Mins | Inside Winch | At Filter Outlet | Inside Winch | At Filter Outlet |
| i) Remazol Red RB | | | | |
| Absorbence at 520 nm | | | | |
| 0 | 0.201 | 0.014 | 0.113 | 0.018 |
| 2 | 0.018 | 0.009 | 0.009 | 0.008 |
| 5 | 0.007 | 0.006 | 0.021 | 0.011 |
| 10 | — | — | 0.011 | 0.036 |
| 15 | 0.008 | 0.007 | 0.009 | 0.012 |
| 30 | 0.007 | 0.007 | 0.009 | 0.009 |
| 45 | 0.010 | 0.006 | — | — |
| 60 | 0.011 | 0.008 | 0.012 | 0.011 |
| i) Procion Turquoise HA | | | | |
| Absorbence at 670 nm | | | | |
| 0 | 1.394 | 0.260 | 1.620 | 0.014 |
| 2 | 0.227 | 0.179 | 0.219 | 0.025 |
| 5 | 0.088 | 0.060 | 0.036 | 0.006 |
| 10 | — | — | 0.017 | 0.002 |
| 15 | 0.050 | 0.047 | 0.016 | 0.003 |
| 30 | — | — | 0.011 | 0.000 |
| 40 | — | — | 0.006 | 0.001 |
| 60 | 0.075 | 0.089 | 0.007 | 0.000 |

Whilst the advantages of Sample 2 are not so obvious for the Remazol Red RB dyeing due to the low level of dyestuff in the winch at the start of filtration, the data for Procion Turquoise clearly shows Sample 2 achieves a much lower concentration of dyestuff in the winch during the 60-minute wash-off.

We claim:

1. In a method for dyeing a substrate in an aqueous dyebath, using a reactive dye and thereafter removing unreacted dye from the substrate by washing the substrate with water in a washing stage, the improvement whereby the amount of water used for removing the unreacted dye is minimized, said improvement comprising the steps of contacting the wash water containing the unreacted dye with an absorbent material which absorbs the unreacted dye in the wash water wherein the absorbent material is hydrotalcite-like material.

2. A method according to claim 1 wherein the wash water, after washing the colored substrate, is removed from the washing stage for contact with said absorbent and therafter returned to the washing stage for further use.

3. A method according to claim 1 or 2 wherein the washing stage is operated at a temperature in the range 60° C. to 100° C.

4. A method according to claim 1 or 2 wherein the absorbent material has a particle size, as measured by light scattering, less than 250 micron.

5. A method according to claim 1 or 2 wherein the absorbent is present in an amount of from 1% to 10% by weight of the substrate.

* * * * *